United States Patent
Perron et al.

(10) Patent No.: US 6,551,051 B2
(45) Date of Patent: *Apr. 22, 2003

(54) GRAPPLE SKIDDER

(75) Inventors: Pierre Alexandre Perron, Roberval (CA); Yvan Edgar Lamontagne, St. Felicien (CA)

(73) Assignee: Trans-Gesco Inc., Roberval (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/521,116

(22) Filed: Mar. 7, 2000

(65) Prior Publication Data

US 2002/0150457 A1 Oct. 17, 2002

(51) Int. Cl.⁷ .................................................. B66C 1/00
(52) U.S. Cl. ...................................... 414/731; 414/729
(58) Field of Search ................................ 414/731, 734, 414/729, 739, 694, 687; 212/272, 256, 259; 180/9.1, 9.23, 9.4, 300, 326, 329, 330

(56) References Cited

U.S. PATENT DOCUMENTS

| | | | | |
|---|---|---|---|---|
| 2,757,037 A | * | 7/1956 | Troyer | 414/731 X |
| 3,003,653 A | * | 10/1961 | Wirkkala | 414/731 |
| 3,472,402 A | * | 10/1969 | Priefert | 414/731 X |
| 3,630,398 A | * | 12/1971 | Cervenak | 414/731 |
| 3,782,567 A | | 1/1974 | Likas et al. | |
| 3,907,137 A | * | 9/1975 | Korbel et al. | 414/734 |
| 4,140,233 A | * | 2/1979 | Muntjanoff et al. | 414/731 |
| 4,365,927 A | * | 12/1982 | Schenck | 414/729 |
| 4,486,136 A | * | 12/1984 | Howard | 414/731 X |
| 4,944,649 A | * | 7/1990 | Stralow | 414/694 X |
| 5,176,491 A | * | 1/1993 | Houkom | 414/694 |
| 5,984,032 A | * | 11/1999 | Gremillion et al. | 180/9.1 X |

* cited by examiner

Primary Examiner—Donald W. Underwood (57) ABSTRACT

A grapple skidder for dragging a bundle of logs or trees from one location to a selected site. The grapple skidder comprises a boom and grapple assembly including a grapple suspended from an arched boom arm pivotally mounted to a linear main boom pivotable between forward and rearward inclined positions. A heel is directly mounted on the underside of the main boom to provide an arresting surface against which the butt ends of the trees abut when the boom and grapple assembly is operated to lift a bundle of trees over another bundle of trees lying on the ground. The arresting surface retains the grasped trees against pivotal movement due to gravitational forces, whereby pivotal movement of the main boom in a direction opposite to that which tend to be induced by the gravitational forces results in the trees being completely lifted off the ground.

13 Claims, 6 Drawing Sheets

FIG. 1

GRAPPLE SKIDDER

BACKGROUND OF THE INVENTION

1. Field of the Invention

The present invention relates to grapple skidder suited for moving an elongated load, such as a group of trees or logs, from one location to a selected location on a terrain.

2. Description of the Prior Art

It is well known to use grapple skidders to drag loads of logs from one location to a selected site. Conventional grapple skidders typically comprise a grapple suspended at the free distal end of a boom mounted on a tow vehicle. The grapple is usually hydraulically operated to open and close about one end of the load to be skidded. In the open position, the grapple is lowered to surround the butt end portion of a load of logs. Then, the grapple is closed and lifted to a position where the grasped end of the load of logs abut the rear end portion of the vehicle rearwardly of the rear axle thereof. This causes substantial tipping forces on the boom section tending to pivot the same rearwardly.

To minimize such tipping forces, it has been proposed, as exemplified by U.S. Pat. No. 3,782,567 issued on Jan. 1, 1974 to Likas et al., to use a boom assembly comprising a small linear boom arm pivotally mounted at a distal end of a main C-shaped boom which is, in turn, pivotally mounted to a vehicle.

Although the structure of the boom assembly disclosed in the above mentioned patent allows to drag an elongated load with one end thereof elevated over the rear axle of the vehicle so as to reduce the couple exerted on the boom by the dragged load, it has been found that there is a need for a new grapple skidder having a boom and grapple assembly offering increased freedom of movement.

It has also been found that there is a need for a grapple skidder having a boom and grapple assembly which can be operated to stack a bundle of trees or logs over another bundle of trees or logs lying on a ground surface.

SUMMARY OF THE INVENTION

It is therefore an aim of the present invention to provide a new grapple skidder having a boom and grapple assembly adapted to lift an elongated load over a ground surface.

It is also an aim of the present invention to provide a grapple skidder which offers increased freedom of movement.

It is a further aim of the present invention to provide a method for completely elevating an elongated load over a ground surface with a grapple skidder.

Therefore, in accordance with the present invention, there is provided a grapple skidder comprising a vehicle, a boom mounted to a rearward end portion of the vehicle, a grapple articulately suspended from a distal end of the boom for grasping an elongated load, and a heel mounted to the boom at a spaced location from the grapple for providing an arresting surface for the elongated load. The boom is pivotable to a first position to locate the grapple beyond the vehicle for embracing the elongated load at a location comprised between a leading end and the center of gravity thereof, and to a second position for lifting the leading end of the elongated load above a ground surface against the arresting surface to retain the elongated load against pivotal movement due to gravitational forces, whereby further pivotal movement of the boom from the second position thereof in a direction away from the first position results in the elongated load being completely lifted above the ground surface.

In accordance with a further general aspect of the present invention, there is provided a grapple skidder comprising a vehicle, a boom mounted to a rearward end portion of the vehicle, a grapple suspended from a distal end of the boom for grasping an elongated load, and a heel mounted to the boom for providing an arresting surface for the elongated load. The boom is pivotable from a first position to locate the grapple beyond the vehicle for embracing the elongated load at a location comprised between a leading end and the center of gravity thereof, to a second position in which the elongated load is completely lifted above a ground surface with the leading end thereof abutting against the arresting surface of the heel, thereby precluding pivotal movement of the grapple and the elongated load relative to the boom due to gravitational forces acting on the elongated load at the center of gravity thereof.

In accordance with a further general aspect of the present invention, there is provided a method of lifting an elongated load over a ground surface with a grapple skidder having an arresting surface, comprising the steps of:

a) grasping the elongated load with a grapple at a selected location comprised between a first end of the elongated load and a center of gravity thereof, b) lifting the first end of the elongated load above the ground surface against the arresting surface of the grapple skidder so as to retain the elongated load against pivotal movement due to gravitational forces, and c) applying further lifting forces at the selected location to completely elevate the elongated load above the ground surface.

In accordance with a further general aspect of the present invention there is provided a grapple skidder comprising a boom assembly including a linear main boom and an arched boom arm. The main boom is mounted to a vehicle for pivotal movement with respect thereto about a substantially horizontal axis. The arched boom arm is pivotally mounted to the main boom. A grapple is mounted at a distal end of the arched boom arm for grasping one end portion of an elongated load to be dragged. At least one arm cylinder extends between the main boom and the arched boom arm for pivoting the same relative to the main boom. The main boom is pivotable relative to the vehicle between first and second positions, wherein in the first position, the main boom is inclined forwardly with respect to a direction of travel of the vehicle during skidding, thereby allowing the elongated load to be dragged with one end portion thereof lifted over the rearward end of the vehicle, while minimizing the overall dimensions of the boom assembly when not in use.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

Now referring to the drawings and in particular to FIG. 1, a grapple skidder 10 suited for transporting loads or drags of logs or trees and embodying the elements of the present invention will be described.

The grapple skidder 10 generally comprises a log skidder or self-propelled tracked vehicle 12 supported on either side thereof by a track 14. Each track 14 is driven by a pair of wheels 16 operating in tandem. A rear chassis 18 is articulated to the front chassis of the vehicle 12 and is driven from the power take-off thereof. The rear chassis 18 is provided in the form of a structural frame 26 supported on either side thereof by a track 20. Each track 20 is driven by front and rear wheels 22 and 24 operating in tandem. It has been found that the use of such an articulated self-propelled tracked vehicle 12 in the context of a grapple skidder is advantageous, as compared to conventional four wheel drive grapple skidders, in that it provides increased traction, floatation, and stability, especially, on soft grounds.

Figure 4:
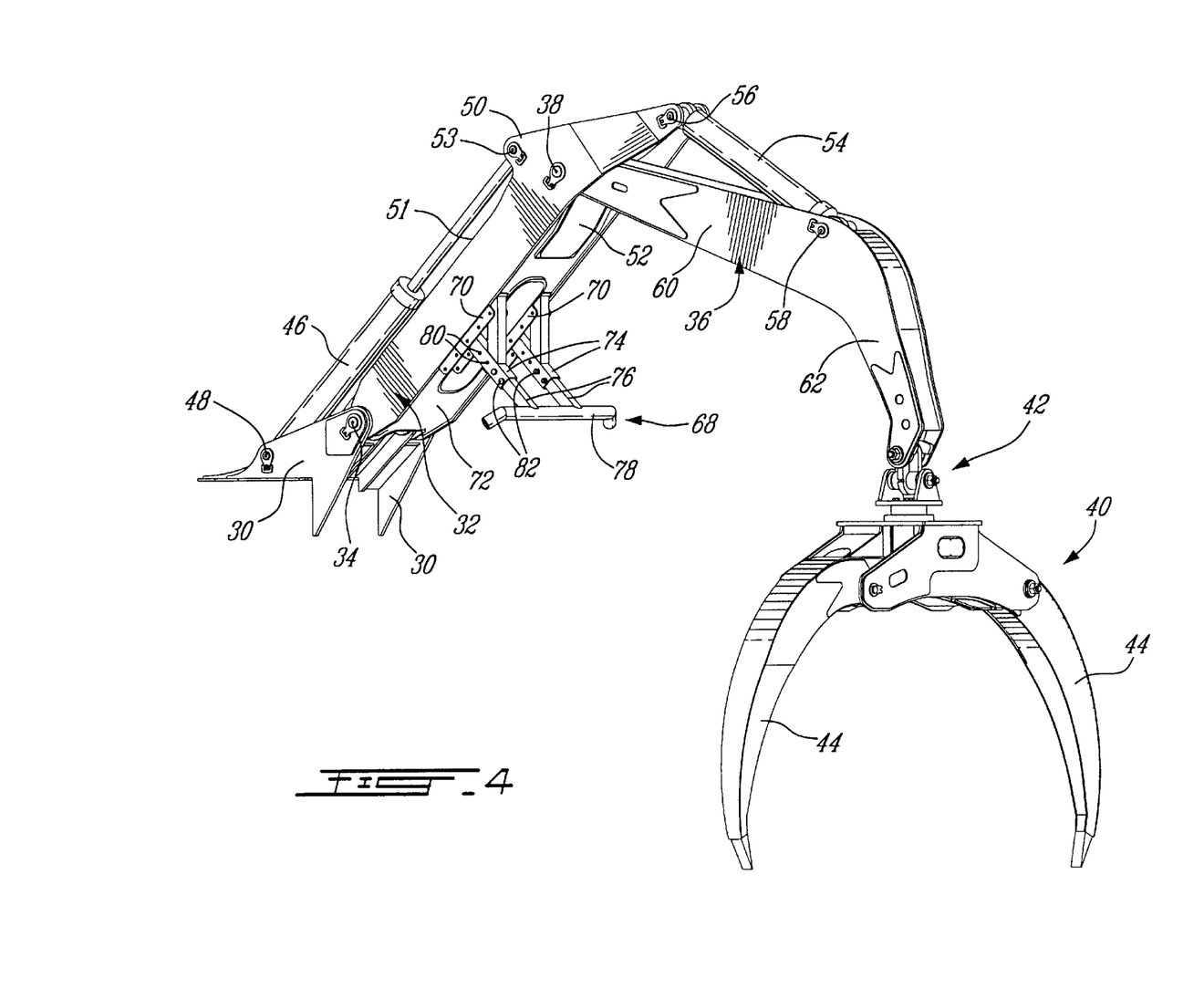
FIG. 4 is a perspective view of a boom and grapple assembly of the grapple skidder of FIG. 1.

A base in the form of a turntable 28 is mounted on the frame 26 substantially between the front and rear wheels 22 and 24 for pivotal movement about a vertical axis. A boom mount 30 is secured on the top surface of the turntable 28. As best seen in FIGS. 1, 2 and 4, a linear main boom 32 is pivotally mounted at a bottom end thereof to the boom mount 30 by means of a pair of hinge pins 34 extending along a horizontal pivot axis (see FIG. 2), Accordingly, the main boom 32 is capable of swinging on the turntable bearings and pivoting about the hinge pins 34 relative to the boom mount 30. Likewise, a boom arm or boom stick 36 is pivotally mounted to the main boom 32 via a horizontal hinge pin 38.

A conventional grapple 40 is freely suspended from the free distal end of the arm 36 by an appropriate grapple coupling 42 that pivots about two axes perpendicular to one another. The grapple 40 includes a pair of opposed arcuate jaw members 44 which can be hydraulically operated to open and close tightly about a bundle of logs or trees piled on the ground in stacked relationship, as is well known in the art.

Figure 1:
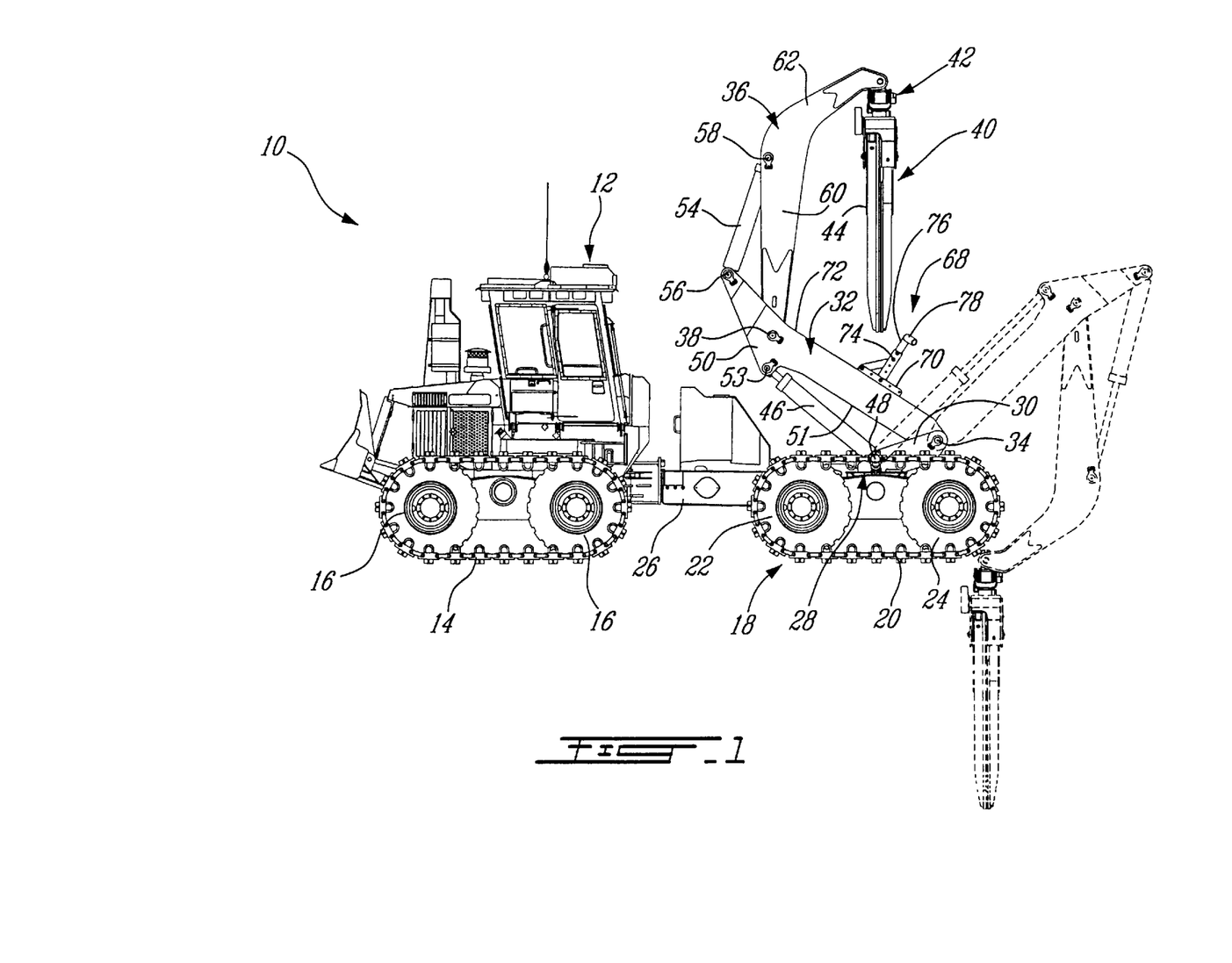
FIG. 1 is a side view of a grapple skidder illustrating the freedom of movement of a boom and grapple assembly thereof in accordance with a first embodiment of the present invention.
Figure 2:
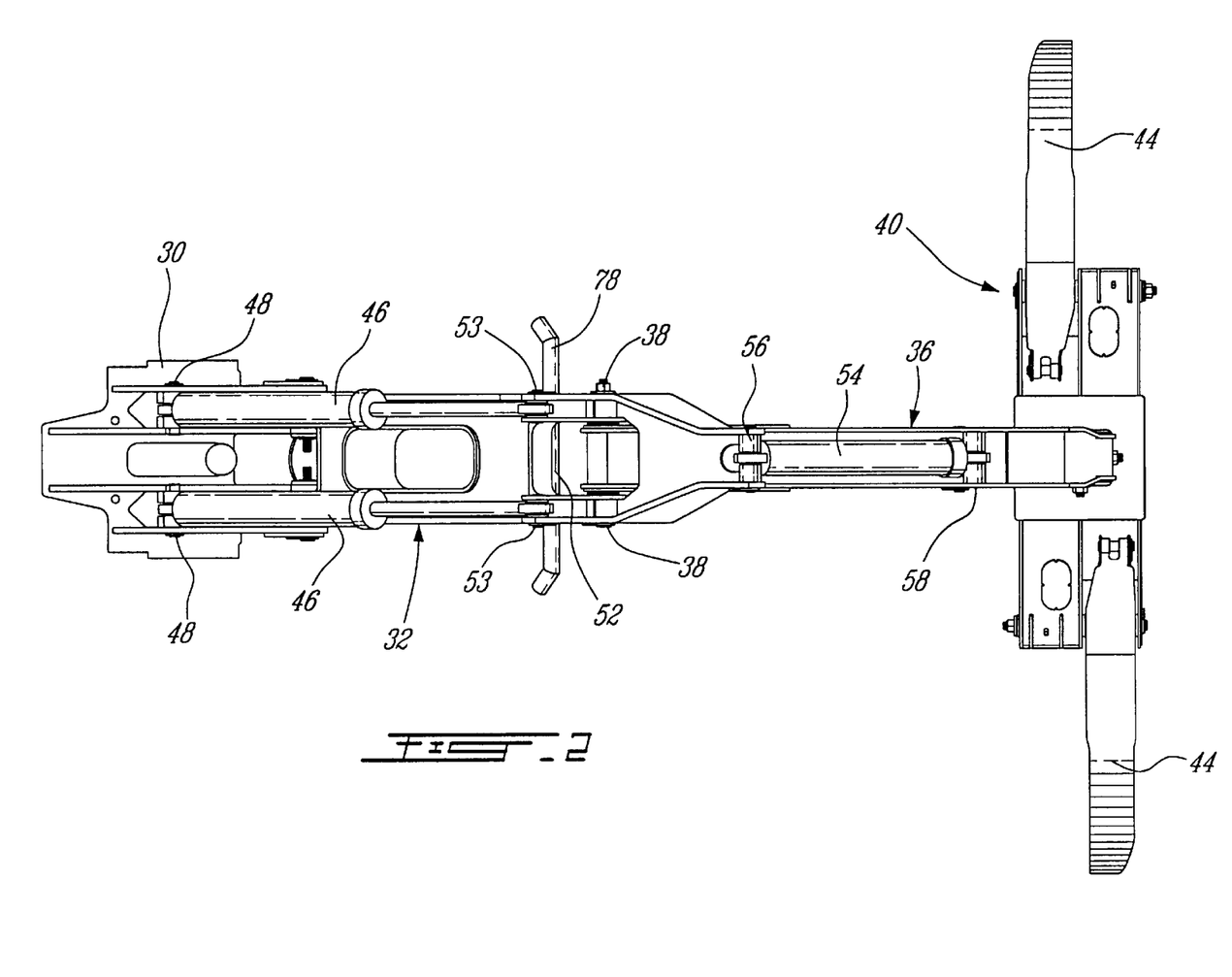
FIG. 2 is a top plan view of the boom and grapple assembly of the grapple skidder of FIG. 1.

As seen in FIGS. 1 and 2, a pair of side-by-side hydraulic cylinders 46 are provided for pivoting the main boom 32 relative to the turntable 28. Each hydraulic cylinder 46 is connected at a first end thereof to the boom mount 30 via a hinge pin 48 located below the hinge pins 34 of the main boom 32. Each hydraulic cylinder 46 is connected at an opposed rod end thereof to a bracket 50 extending integrally away from a top surface 51 of the main boom 32, at a pivot point 53 spaced from the main boom 32 itself to provide a lever arm for the movement of the main boom 32. Hydraulic lines (not shown) provide pressurized hydraulic fluid to retract and extend the boom cylinders 46, as is well known in the art.

As seen in FIGS. 2 and 4, the proximal end of the arm 36 is received in a central rectangular cutout portion 52 provided in the main boom 32 at a location spaced lengthwise from the distal end thereof. A single central hydraulic arm cylinder 54 is provided on a top side of the arm 36 for pivoting the same relative to the main boom 32. The arm cylinder 54 is pivotally connected at a first end thereof to the distal end of the main boom 32 via a hinge pin 56. Likewise, the arm cylinder 54 is pivotally connected at a second opposed end thereof to the boom arm 36 by means of a hinge pin 58.

The boom arm 36 has a proximal linear segment 60 and a distal arched segment 62 extending integrally downwardly from the linear segment 60. The hinge pin 58 is located substantially adjacent the root of the arched segment 62, i.e. at the end of the linear segment 60 near the junction of the linear and arched segments 60 and 62. As to the hinge pins 38 connecting the boom arm 36 to the main boom 32, they are disposed at a location between the opposed ends of the boom 32 below the point of pivot of the arm cylinder 54 relative to the main boom 32 and immediately above the point of connection of the boom cylinders 46 and the main boom 32. The shape of the main boom 32 and the boom arm 36 in combination with the emplacement of the arm cylinder 54 between the boom arm 36 and the main boom 32 provide a boom assembly which is foldable upon itself, thereby allowing the overall dimensions of the boom assembly to be minimized for transport and storage purposes. Furthermore, the fact the main boom 32 is displaceable to a forwardly inclined position, as illustrated in full line in FIG. 1, also allows an elongated load, such as a bundle of trees or logs, to be dragged with the leading ends thereof elevated just over the rear wheel 24 of the grapple skidder 10, thereby minimizing the couple transmitted to the boom 32 by the dragged load.

The above described relative disposition of the various points of connection between the boom mount 30, the main boom 32, the boom arm 36, the boom cylinders 46 and the arm cylinder 54 has been found suitable to maximize the freedom of movement of the main boom 32 and the boom arm 36 while preserving the lifting capacity thereof.

As seen in FIG. 1, the boom 32 and boom arm 36 are displaceable between a fully retracted position in which the boom 32 is inclined forwardly with respect to a direction of travel of the tracked vehicle 12, while the arm 36 extends in a generally vertical direction with the grapple 40 hanging therefrom over the rear chassis 18 between the front and rear wheels 22 and 24 thereof, and a fully deployed position (shown in dotted lines) wherein the boom 32 is inclined rearwardly and the arm 36 extends downwardly therefrom in a generally vertical direction. According to a preferred embodiment of the present invention, the boom 32 extends at about 65 degrees from the vertical when displaced to its retracted position and about 55 degrees when displaced to its deployed position.

Figure 3:
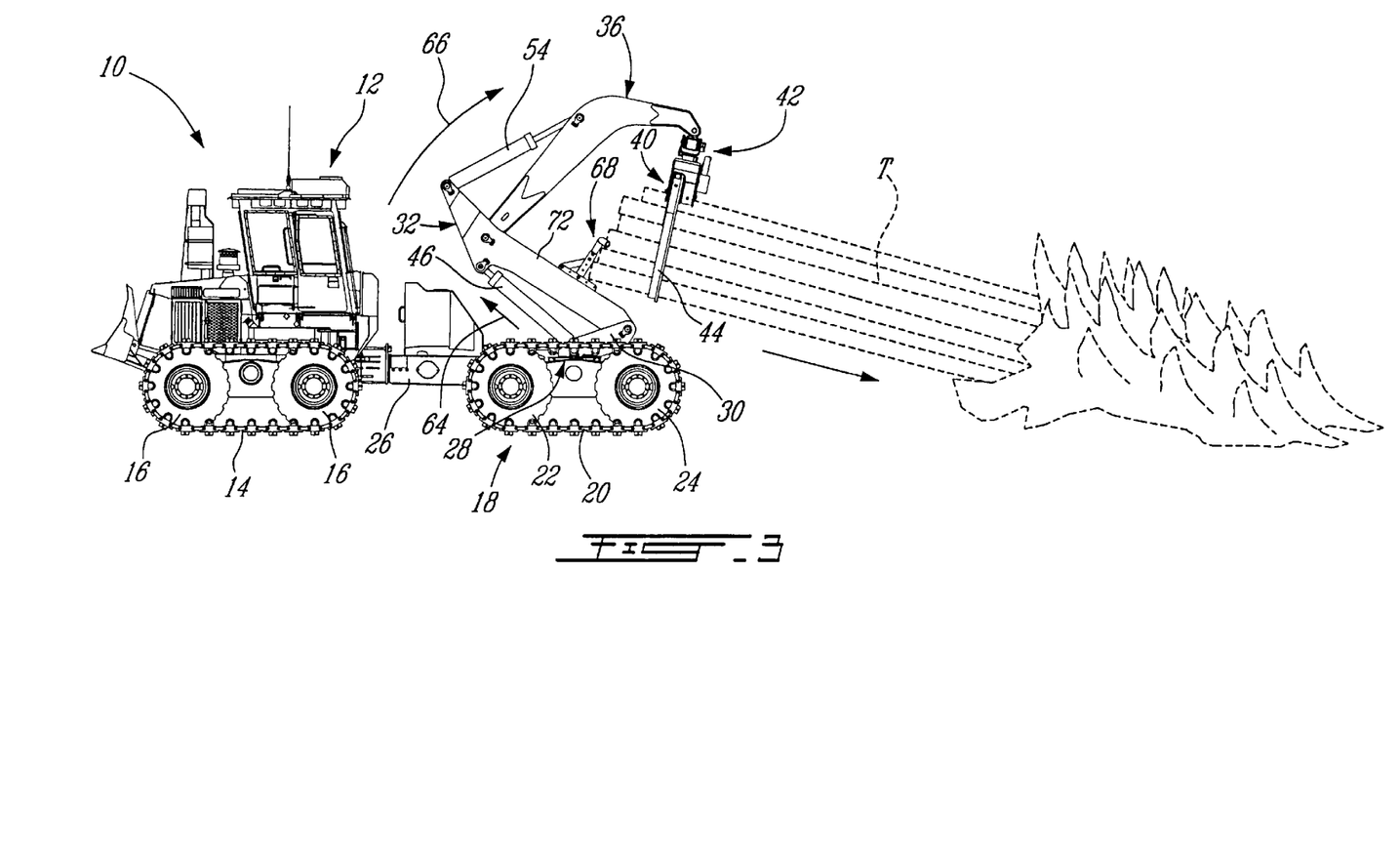
FIG. 3 is a side view of the grapple skidder illustrated in the process of dragging endwise a bundle of trees from on location to another selected location.

As seen in FIG. 3, the mobility of the main boom 32 and boom arm 36 allows the grapple skidder 10 to drag a bundle of trees T with the butt ends thereof elevated over the rear wheels 24 of the rear chassis 18 and the other ends of the trees remaining in contact with the ground. By skidding the bundle of trees T with the butt ends thereof lifted directly over the rear chassis 18, the flexural forces exerted on the main boom 32 and the frame 26 by the trees T, which are being dragged, can be advantageously reduced.

In the vehicle loaded and skidding position illustrated in FIG. 3, the boom cylinders 46 and the arm cylinder 54 are respectively fully and partly retracted so as to position the grapple 40 substantially over the rear wheel 24 of the rear chassis 18. The grapple 40 tightly grasped the bundle of trees T at an appropriate location adjacent the butt ends of the trees T.

In the event that the grapple skidder 10 becomes stuck in a soft ground while dragging a bundle of trees T, the boom cylinders 46 can be extended from the retracted position thereof to a fully or partly extended position, as indicated by arrow 64 in FIG. 3, to cause the main boom 32 to pivot in the direction indicated by arrow 66 in order to push the vehicle in a forward direction with the bundle of trees T.

As seen in FIG. 4, the grapple skidder 10 further includes a heel 68 which is mounted on the main boom 32 near the bottom end thereof. The heel 68 includes a pair of laterally spaced-apart parallel mounting plates 70 which are secured to the underside 72 of the main boom 32. A square tube 74 extends at right angle from each mounting plate 70 for slidably receiving a corresponding one of a pair of legs 76 extending from a transversal arresting bar 78. The opposed ends of the arresting bar 78 are curved inwardly to embrace the sides of the bundle of trees T which are being lifted by the grapple skidder 10. Transversal through bores 80 are distributed along the square tubes 74 and the legs 76 for receiving fasteners 82 in order to secure the legs 76 to the square tubes 74 in one of a selected positions. This thus allows to adjust the spacing between the arresting bar 78 and the underside 72 of the main boom 32.

Figure 5:
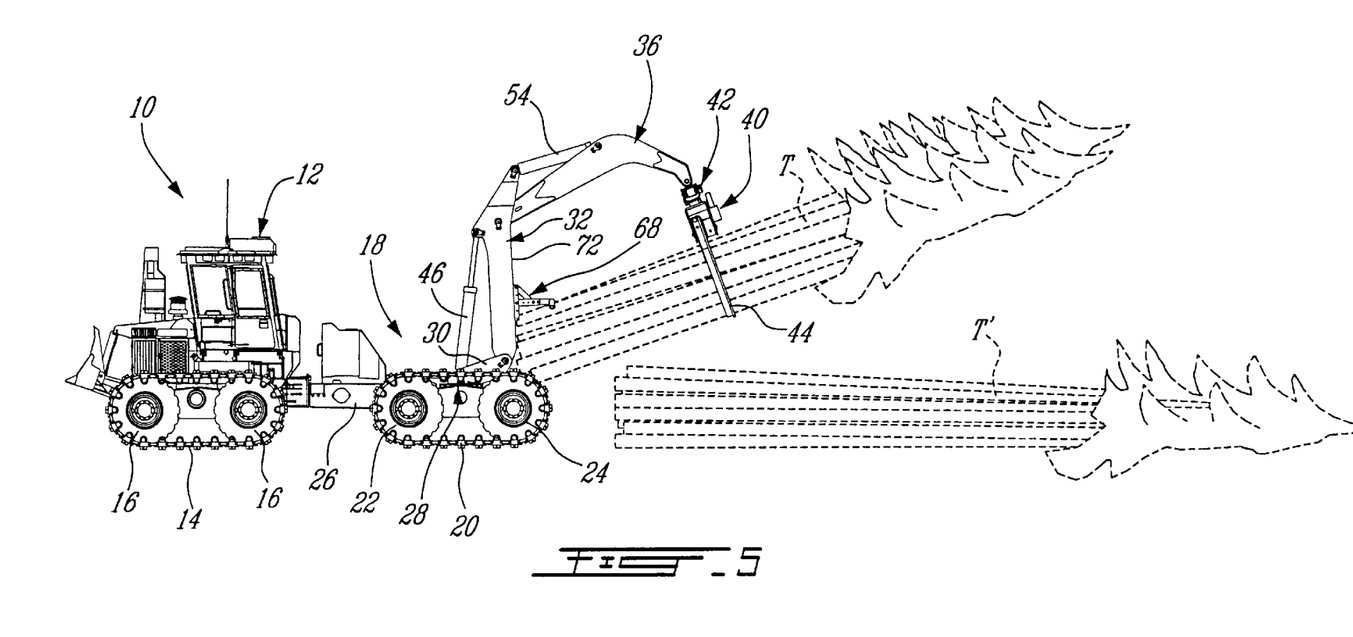
FIG. 5 is a side view of the grapple skidder illustrating how the boom and grapple assembly thereof can be operated to lay a bundle of trees on another bundle of trees lying on a ground surface.

The location of the heel 68 allows the grapple skidder 10 to completely lift a bundle of trees T above the ground over another bundle of trees T' lying on the ground (see FIG. 5). Accordingly, the grapple skidder 10 can advantageously be used to stack a bundle of trees onto another. The stacking operation is accomplished by first extending the boom cylinders 46 while the arm cylinder 54 remains retracted so as to locate the grapple 40 behind the rear chassis 18 for embracing a bundle of trees T, which lies on the ground, at a location comprised between their butt ends and their center of gravity. The jaw members 44 of the grapple 40 are then caused to close tightly around the bundle of trees T. Thereafter, the boom cylinders 46 are retracted to displace the main boom 32 in a generally vertical orientation so as to lift the butt ends of the bundle trees T, and the arm cylinder 54 is extended to locate the butt ends of the grasped bundle of trees T under the heel 68. Once the butt ends have been elevated directly under the heel 68, further contraction of the boom cylinders 46 will first cause the butt ends of the bundle of trees to engage the arresting bar 78, thereby preventing pivotal movement of the bundle of trees T due to gravitational forces, and then result in the grasped bundle of trees T being completely lifted off the ground.

Figure 6:
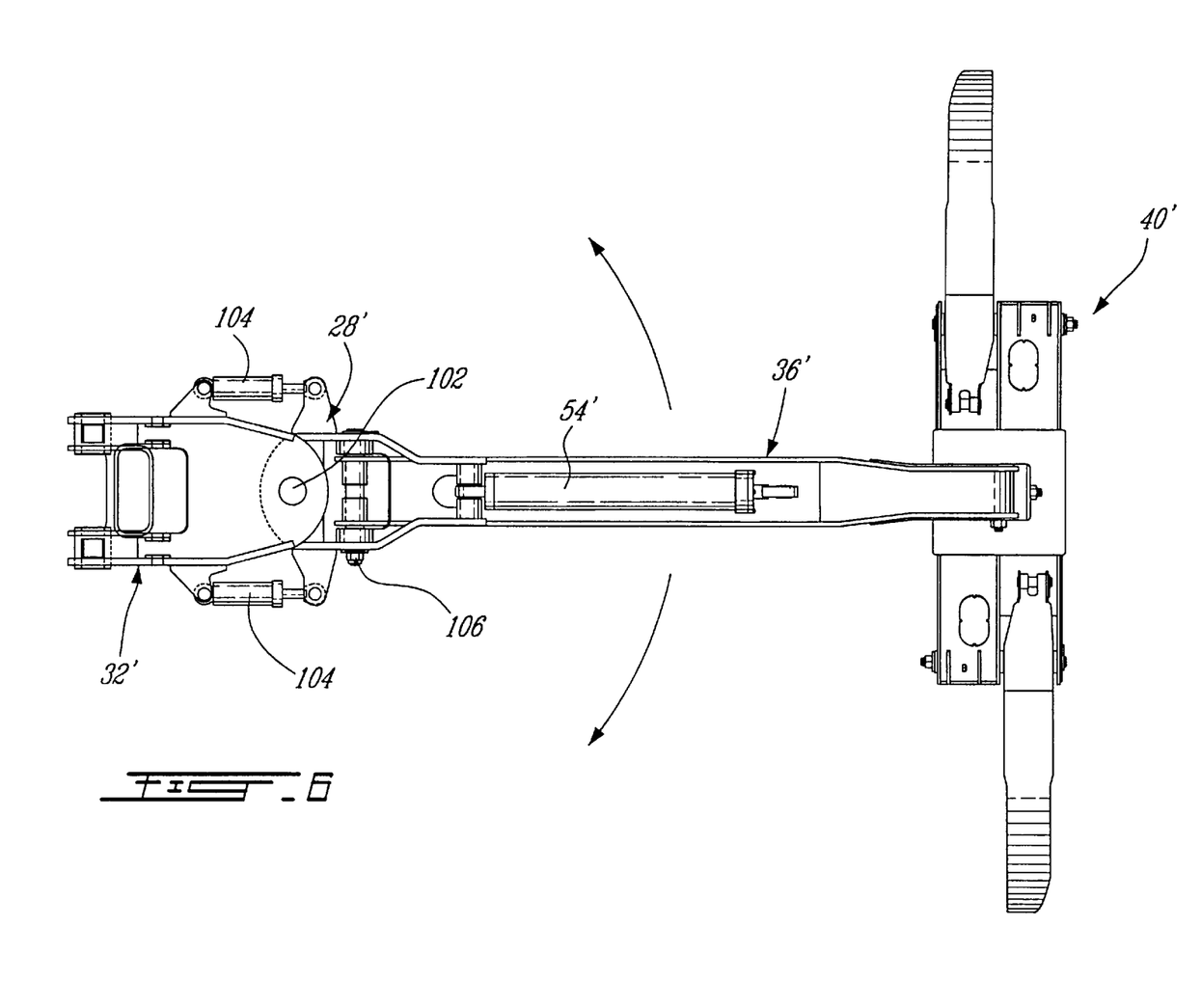
FIG. 6 is top plan view of a boom and grapple assembly of a grapple skidder in accordance with a second embodiment of the present invention.

FIG. 6 illustrates a second embodiment of the present invention which is similar to the first one with the exception that the turntable 28' has been incorporated at the articulation between the boom arm 36' and the main boom 32' rather than being provided on the rear chassis 18 at the bottom of the main boom 32'. Accordingly, the arm 36' is adapted to pivot relative, to the main boom 32' about two axes perpendicular to one another. The turn table 28' is mounted on the main boom 32' for pivotal movement about a pivot 102. A pair of lateral cylinders 104 extend between the turntable 28' and the main boom 32' to pivot the turntable 28' about the pivot 102 laterally relative to the main boom 32'. The boom arm 36' is pivotally mounted to the turntable 28' for pivotal movement about a pivot 106. A boom arm cylinder 54' is provided between the boom arm 36' and the turntable 28' to pivot the boom arm 36' about its pivot axis 106.

What is claimed is:

1. A grapple skidder comprising a vehicle, a boom mounted to a rearward end portion of said vehicle, said boom including a main boom and a boom stick articulated to said main boom, a grapple articulately suspended from a distal end of said boom stick for grasping an elongated load, a boom actuator connected on a top side of said main boom, and a heel mounted to a proximal end portion of said main boom on an undersurface thereof opposite said boom actuator, said heel including a stem portion extending from said undersurface of said main boom in a direction transversal to a longitudinal axis of said main boom and an arresting surface at a distal end portion of said stem, said boom being pivotable to a first position to locate said grapple beyond said vehicle for embracing the elongated load at a location comprised between a leading end and the center of gravity thereof, and to a second position for lifting the leading end of the elongated load above a ground surface against said arresting surface to retain the elongated load against pivotal movement due to gravitational forces, whereby further pivotal movement of said boom from said second position thereof in a direction away from said first position results in the elongated load being completely lifted above the ground surface.

2. A grapple skidder as defined in claim 1, wherein said arresting surface is substantially perpendicular to said undersurface.

3. A grapple skidder as defined in claim 2, wherein said arresting surface is adjustably positionable at selected fixed positions along two independent directions relative to said undersurface.

4. A grapple skidder as defined in claim 1, wherein said main boom is pivotally mounted at said proximal end portion thereof to said vehicle, said main boom being pivotable between forward and rearward inclined positions relative to said vehicle, and wherein said grapple is pivotable to a position wherein the grapple is substantially parallel to the boom stick to allow the elongated load to be carried above the rearward portion of the vehicle once said main boom has been pivoted to said forward inclined position thereof.

5. A grapple skidder as defined in claim 1, wherein said boom actuator includes at least one primary cylinder for pivoting said main boom relative to said vehicle, and at least one secondary cylinder for pivoting said boom stick relative to said main boom, said secondary cylinder being pivotally connected at a first end thereof to a distal end of said main boom and at a second end thereof to said boom stick, and wherein said boom stick is pivotally connected to said main boom between said proximal and distal ends thereof.

6. A grapple skidder as defined in claim 1, wherein said vehicle includes a self-propelled tracked vehicle having front and rear frames articulately connected to one another, said front and rear frames being both fitted with power driven tracks on either side thereof.

7. A grapple skidder comprising a vehicle, a boom mounted to a rearward end portion of said vehicle, said boom including a main boom and a boom stick, a grapple suspended from a distal end of said boom stick for grasping an elongated load, and a heel mounted to said main boom, said heel including a stem portion projecting from an undersurface of said main boom and an arresting surface at a distal end portion of said stem portion, said arresting surface being configured to engage the load grasped by the grapple and move with the load in response to a movement of said main boom, said boom being pivotable from a first position to locate said grapple beyond said vehicle for embracing the elongated load at a location comprised between a leading end and the center of gravity thereof, to a second position in which the elongated load is completely lifted above a ground surface with the leading end thereof abutting against said arresting surface of said heel, thereby precluding pivotal movement of said grapple and the elongated load relative to said boom due to gravitational forces acting on said elongated load at said center of gravity thereof, wherein said main boom is pivotally mounted at a proximal end thereof to said vehicle, said boom stick being pivotally mounted to said main boom, said grapple being suspended from said boom stick, said main boom being pivotable between forward and rearward inclined positions relative to said vehicle, and wherein said grapple is pivotable to a position wherein said grapple is substantially parallel to said boom stick.

8. A grapple skidder as defined in claim 7, wherein said arresting surface is substantially perpendicular to said undersurface.

9. A grapple skidder as defined in claim 8, wherein said arresting surface is adjustably positionable at selected fixed positions along two independent directions relative to said undersurface.

10. A grapple skidder as defined in claim 7, wherein said main boom and said boom stick are pivoted by power means provided on a top side thereof, and wherein said main boom extends over a frame of said vehicle when pivoted to said forward inclined position.

11. A grapple skidder as defined in claim 7, wherein said power means include at least one primary cylinder for pivoting said main boom relative to said vehicle, and at least one secondary cylinder for pivoting said boom stick relative to said main boom, said secondary cylinder being pivotally connected at a first end thereof to a distal end of said main boom and at a second end thereof to said boom stick, and wherein said boom stick is pivotally connected to said main boom between said proximal and distal ends thereof.

12. A grapple skidder as defined in claim 7, wherein said vehicle includes a self-propelled tracked vehicle having front and rear frames articulately connected to one another, said front and rear frames being both fitted with power driven tracks on either side thereof.

13. A grapple skidder comprising a boom assembly including a linear main boom and an arched boom arm, said main boom being mounted to a vehicle for pivotal movement with respect thereto about a substantially horizontal axis, a heel mounted to a proximal end portion of said main boom, said heel including a stem portion projecting from an undersurface of said main boom and an arresting surface at a distal end portion of said stem portion, said arched boom arm being pivotally mounted to said main boom, a grapple mounted at a distal end of said arched boom arm for grasping one end portion of an elongated load to be dragged, and at least one arm cylinder extending between said main boom and said arched boom arm for pivoting the same relative to said main boom, said main boom being pivotable relative to said vehicle between first and second positions, wherein in said first position, said main boom is inclined forwardly with respect to a direction of travel of said vehicle during skidding and with an undersurface thereof facing upwardly, thereby allowing the elongated load to be dragged with one end portion thereof lifted over the rearward end of the vehicle, while minimizing the overall dimensions of the boom assembly when not in use.

\* \* \* \* \*